(12) United States Patent
Urashima et al.

(10) Patent No.: US 8,214,755 B2
(45) Date of Patent: Jul. 3, 2012

(54) INFORMATION PROCESSING APPARATUS AND INFORMATION PROCESSING METHOD (75) Inventors: Hiroki Urashima, Kawasaki (JP); Masaji Munekuni, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 12/129,021

(22) Filed: May 29, 2008

(65) Prior Publication Data

US 2008/0298683 A1 Dec. 4, 2008

(30) Foreign Application Priority Data

May 31, 2007 (JP) ................................. 2007-146021

(51) Int. Cl.
*G06F 13/00* (2006.01)
*G06F 15/00* (2006.01)
(52) U.S. Cl. ........................................ 715/764; 715/765
(58) Field of Classification Search .......... 715/716–719, 715/735–737, 763–765, 794–801
See application file for complete search history.

(56) References Cited

U.S. PATENT DOCUMENTS

2004/0175764 A1* 9/2004 Nishiyama et al. ............ 435/7.2
2008/0075338 A1* 3/2008 Muramatsu et al. .......... 382/118

FOREIGN PATENT DOCUMENTS

JP 2004215041 A 7/2004

* cited by examiner

*Primary Examiner* — Cao "Kevin" Nguyen
(74) *Attorney, Agent, or Firm* — Canon USA Inc. IP Division (57) ABSTRACT

An object is designated as a designated object. Two or more image data items containing objects each being different from the designated object by an amount smaller than or equal to a first predetermined value are selected from among a specific image data item group. The selected two or more image data items are displayed in two or more display regions provided on a display unit. The objects each being different from the designated object by the amount smaller than or equal to the first predetermined value are defined as main objects, the two or more image data items are adjusted such that differences in position and size of the main objects in the display regions between the two or more image data items are made smaller than or equal to a second predetermined value, and the adjusted two or more image data items are displayed.

12 Claims, 7 Drawing Sheets

INFORMATION PROCESSING APPARATUS AND INFORMATION PROCESSING METHOD

BACKGROUND OF THE INVENTION

1. Field of the Invention

The present invention relates to information processing apparatuses, information processing methods, and programs that are suitable for performing comparison of objects between a plurality of image data items.

2. Description of the Related Art

In recent years, digital cameras have been widely used. Under such circumstances, not only professional photographers but also many general users edit photographs by using personal computers (PCs). In the case of editing, printing, and recording of image data, users have performed operations, such as comparison of image data items and selection of the best photograph, by using a list of images or the like.

In such operations, it is necessary for users to adjust display magnifications and display positions of image data items so that the users can easily select an image data item containing an object to be edited from among a plurality of image data items and compare the plurality of image data items. Thus, users must perform cumbersome processing.

An image processing apparatus designed to solve the above-described problem is described in Japanese Patent Laid-Open No. 2004-215041. The image processing apparatus displays a plurality of images on a screen and then adjusts display sizes of the images such that the displayed images fit within the screen. After that, in response to an instruction from a user, the image processing apparatus adjusts the size of only a single image or causes the sizes of multiple images to be adjusted in conjunction with adjustment of the size of a single image. In addition, Japanese Patent Laid-Open No. 2004-215041 describes that enlarging or contracting processing is performed in accordance with the number of pixels of image data or the zooming magnification for photographing. An example in which, as a result of such processing, the sizes of main objects in two images are finally made the same as each other is also provided in the Japanese Patent Laid-Open No. 2004-215041.

However, the example described in Japanese Patent Laid-Open No. 2004-215041 is merely a specialized example for the case that an image data item containing a main object has a specific configuration, and desired results may not always be obtained in the case of using other various image data items. For example, in a case where two image data items containing main objects that are disposed in substantially corresponding positions are used, the image processing apparatus described in Japanese Patent Laid-Open No. 2004-215041 can be used. However, in a case where the main objects are disposed in different positions, using such an image processing apparatus does not yield a desired result. That is, image data items that can be processed using the image processing apparatus described in Japanese Patent Laid-Open No. 2004-215041 are significantly restricted.

SUMMARY OF THE INVENTION

The present invention provides an information processing apparatus, an information processing method, and a program that are capable of easily performing comparison of objects between a plurality of image data items, the positions of the objects in the plurality of image data items being different from each other.

According to an aspect of the present invention, an information processing apparatus includes an object designation unit configured to designate an object as a designated object; a data item selection unit configured to select, from among a specific image data item group, two or more image data items containing objects each being different from the designated object by an amount less than or equal to a first predetermined value; and a display control unit configured to display the two or more image data items selected by the data item selection unit in two or more display regions provided on a display unit. The display control unit defines, as main objects, the objects each being different from the designated object by the amount less than or equal to the first predetermined value, adjusts the two or more image data items such that differences in position and size of the main objects in the display regions between the two or more image data items are made less than or equal to a second predetermined value, and displays the adjusted two or more image data items.

According to another aspect of the present invention, an information processing method includes an object designation step of designating an object as a designated object; a data item selection step of selecting, from among a specific image data item group, two or more image data items containing objects each being different from the designated object by an amount less than or equal to a first predetermined value; and a display control step of displaying the two or more image data items selected in the data item selection step, in two or more display regions provided on a display unit. In the display control step, the objects each being different from the designated object by the amount less than or equal to the first predetermined value are defined as main objects, the two or more image data items are adjusted such that differences in position and size of the main objects in the display regions between the two or more image data items are made less than or equal to a second predetermined value, and the adjusted two or more image data items are displayed.

Accordingly, since the display control unit adjusts differences in position and size of main objects between two or more image data items and displays the adjusted two or more image data items, comparison of the objects can be performed easily.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described with reference to the drawings. The embodiments described below are merely exemplary embodiments and are not intended to limit the scope of the present invention to the exemplary embodiments. Hereinafter, embodiments of the present invention will be described in details with reference to the attached drawings.

Figure 1:
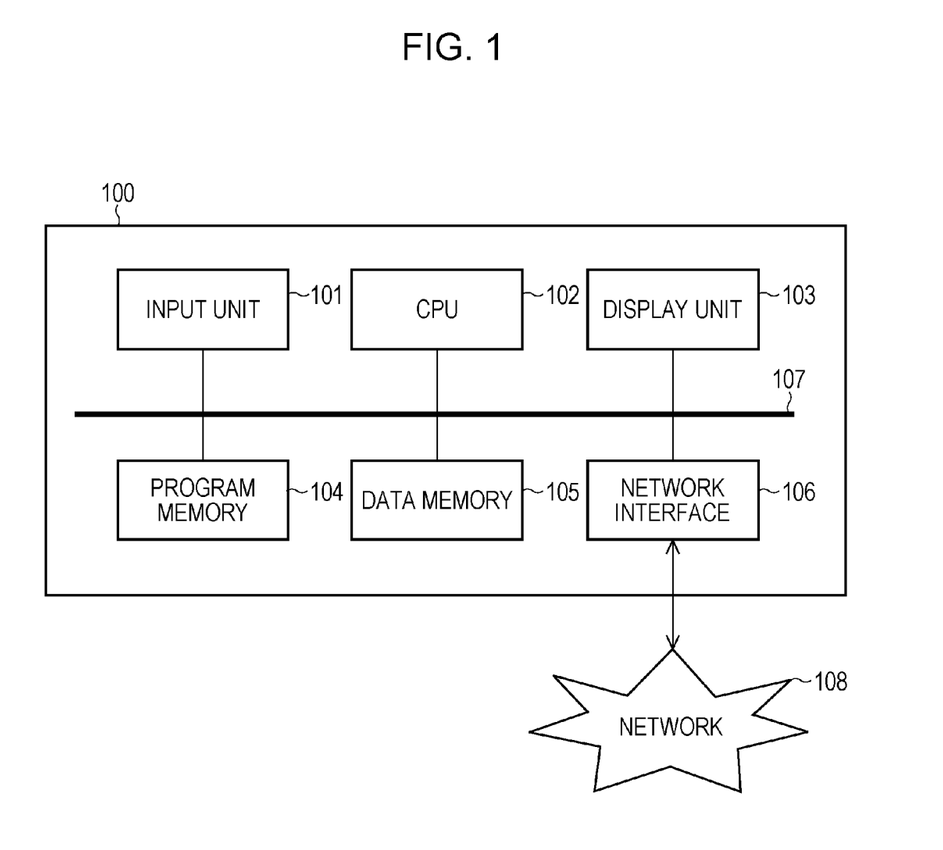
FIG. 1 is a block diagram showing the hardware configuration of an information processing apparatus according to a first embodiment of the present invention.

A first embodiment of the present invention will be described. FIG. 1 is a block diagram showing the hardware configuration of an information processing apparatus 100 according to a first embodiment of the present invention.

The information processing apparatus 100 according to the first embodiment includes an input unit 101, a central processing unit (CPU) 102, a display unit 103, a program memory 104, a data memory 105, a network interface 106, and a bus 107. The input unit 101, the CPU 102, the display unit 103, the program memory 104, the data memory 105, and the network interface 106 are connected to each other via the bus 107.

The input unit 101 is used when a user inputs information (data). For example, a keyboard, a mouse, and/or a remote controller are used as the input unit 101. The keyboard, the mouse, and/or the remote controller may be wired or wireless.

The CPU 102 performs calculation, logical determination, and the like regarding various types of processing in accordance with a program stored in the program memory 104, and controls each of the units connected to the bus 107.

The display unit 103 serves as a display unit on which information (data) is to be displayed. For example, a display, such as a liquid crystal display (LCD) or a cathode-ray tube (CRT), is used as the display unit 103.

A program to be executed by the CPU 102 is stored in the program memory 104. For example, a read-only memory (ROM), a random-access memory (RAM) to which a program stored in an external storage device or the like is to be loaded, or the like is used as the program memory 104.

Data generated as a result of processing performed by the CPU 102 is stored in the data memory 105. Data necessary for processing to be performed by the CPU 102 and the like may be loaded in advance from a non-volatile external storage device or the like to the data memory 105. In addition, data stored in the data memory 105 is referred to by the CPU 102 in an appropriate manner. For example, a RAM is used as the data memory 105.

The network interface 106 transmits and receives information (data) and the like to and from an external device and/or a storage medium via a network 108.

The bus 107 transfers an address signal for designating a unit to be controlled by the CPU 102, a control signal for controlling each unit, and data to be transmitted and received to and from each unit.

Figure 2:
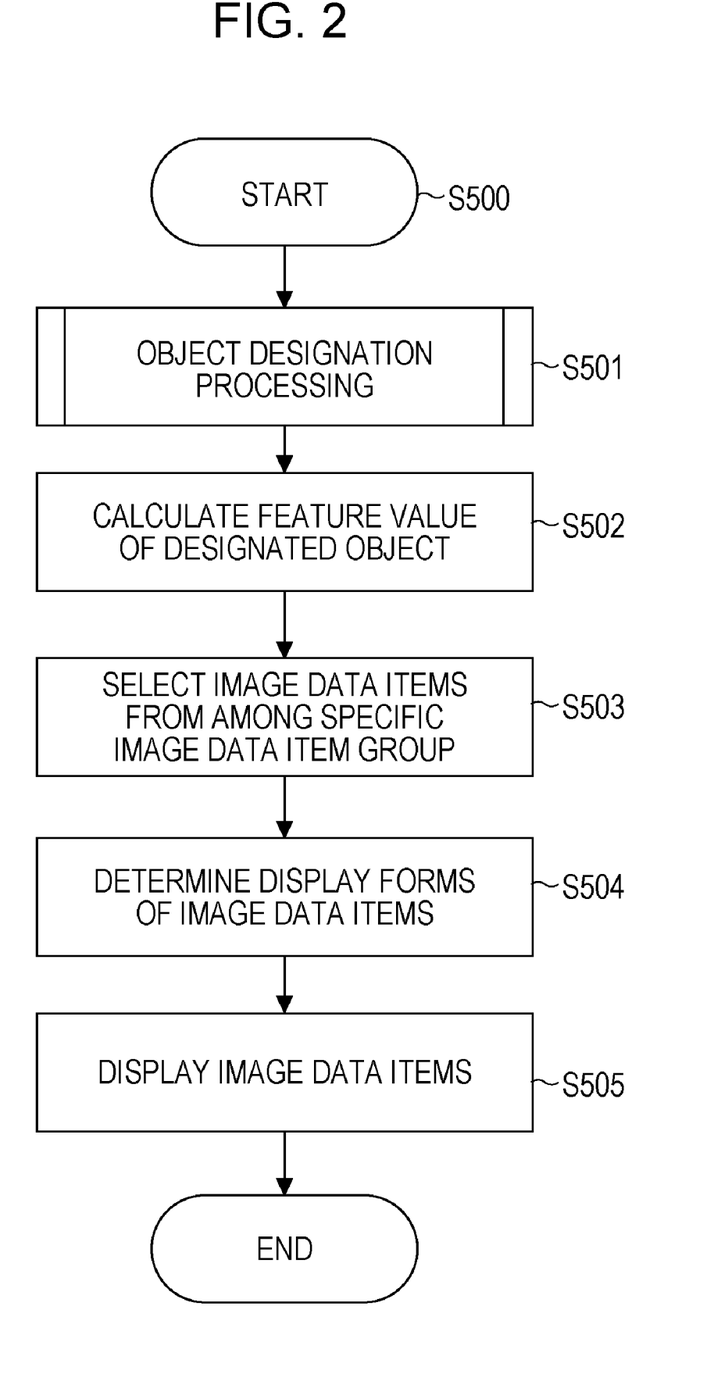
FIG. 2 is a flowchart showing the details of a process to be performed in accordance with a program stored in a program memory.

A program stored in the program memory 104 will now be described. FIG. 2 is a flowchart showing the details of a process to be performed in accordance with the program stored in the program memory 104. In the present embodiment, when executing the program stored in the program memory 104, the CPU 102 serves as an object designation unit, a data item selection unit, and a display control unit.

Figure 3:
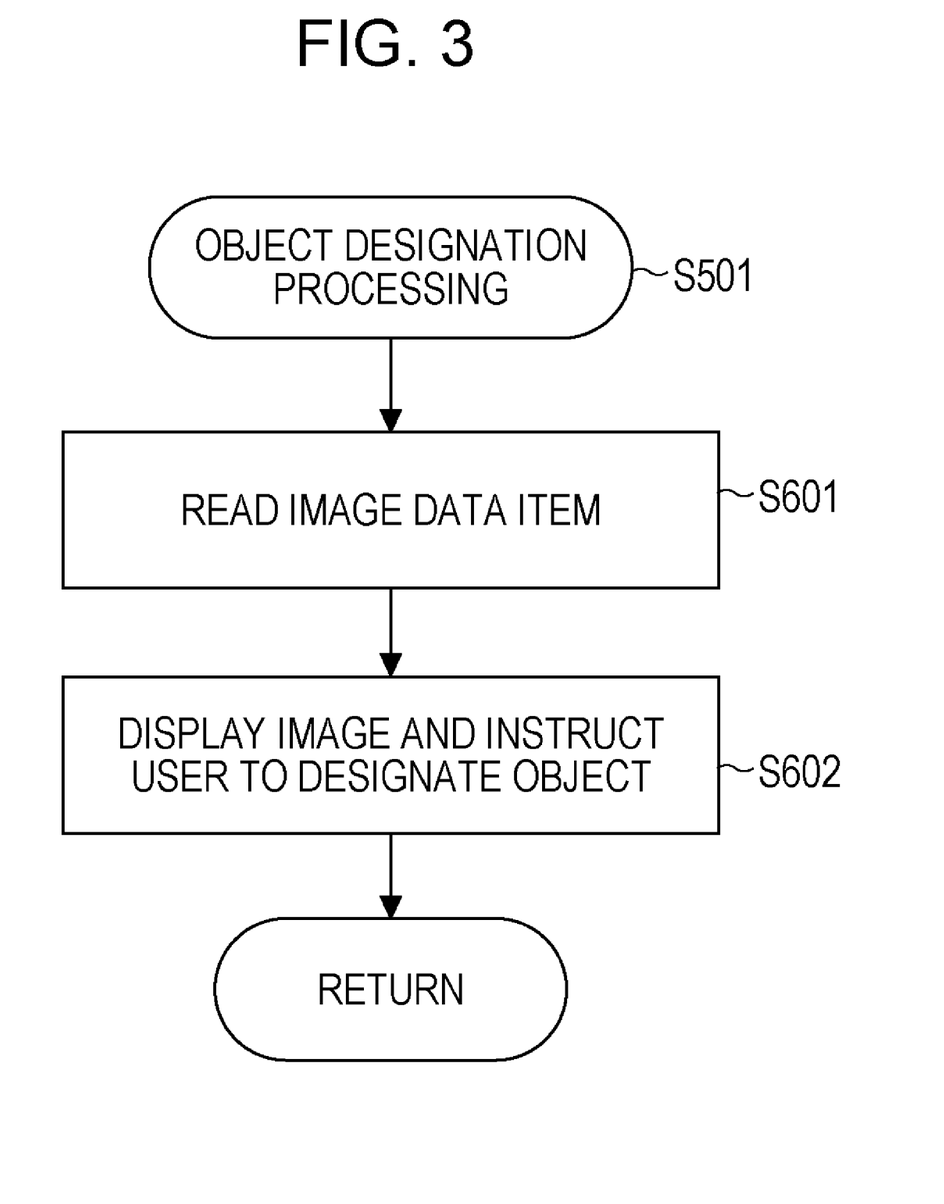
FIG. 3 is a flowchart showing the details of processing of step S501 in the first embodiment.

In the present embodiment, in step S501, the CPU 102 allows a user to designate an object. FIG. 3 is a flowchart showing the details of the processing of step S501.

In the processing of step S501, the CPU 102 allows the user to designate an image data item and reads the designated image data item from the data memory 105 or a device or the like connected to the network 108 in step S601. Then, the CPU 102 detects one or more selectable objects contained in the read image data item. An object is, for example, a human being, a human face, an animal, two-dimensional or three-dimensional graphics, etc. However, an object may be a recognizable object of a different type.

In step S602, the CPU 102 causes an object designation screen containing the image data item read in step S601 to be displayed on the display unit 103 and allows the user to designate, as a designated object, one of the detected one or more selectable objects.

Figure 4:
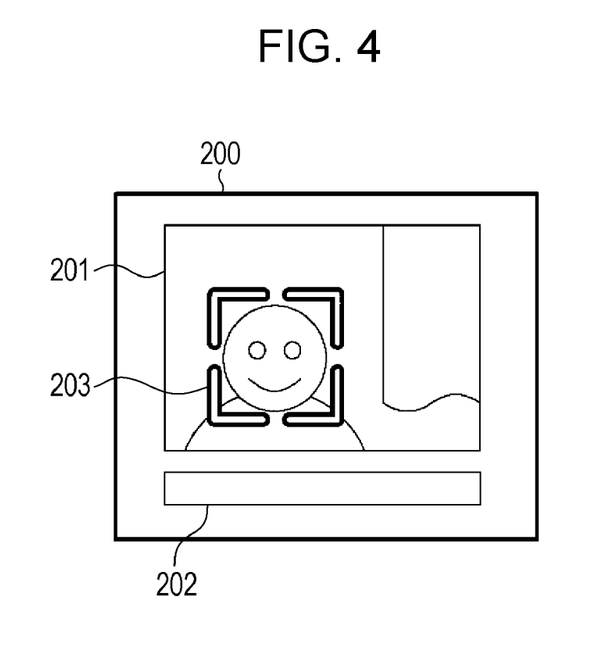
FIG. 4 is an illustration of an example of an object designation screen used in the first embodiment.

FIG. 4 is an illustration of an example of an object designation screen 200. The object designation screen 200 contains an image data item 201 designated by the user and a panel 202 on which a message is to be displayed. One or more selectable objects detected by the CPU 102 are demonstrated on the object designation screen 200, and a message urging the user to designate one of the detected one or more selectable objects is displayed on the panel 202. The user designates one of the detected one or more selectable objects, and a mark 203 is provided to the designated object. In the example shown in FIG. 4, a face image is designated as an object.

In the case that the image data item 201 contains only one selectable object, the CPU 102 may regard the object as a designated object, without allowing the user to designate the object, in step S602.

After the processing of step S501, the CPU 102 calculates, as a reference feature value, the feature value of the designated object. As described below, the reference feature value is used to identify, from among other image data items, an object that can be regarded as being identical to the designated object.

In step S503, the CPU 102 selects, in accordance with the reference feature value, two or more image data items as selected image data items from among a specific image data item group. As in the example shown in FIG. 4, in the case that a face image is designated as a designated object in step S602 and the feature value of the designated object is obtained as a reference feature value in step S502, face images are detected and the feature value of each of the detected face images is compared with the reference feature value. If the difference between the feature value of a detected face image and the reference feature value is less than or equal to a predetermined value, the face image is identified as a main object and an image data item containing the face image is selected. The specific image data item group is stored, for example, in the data memory 105 or a device or the like connected to the network 108. In a case where no or only one image data item can be selected as a selected image data item, a message indicating that no or only one image data item can be selected as a selected image data item is displayed on the display unit 103, and the process is terminated. This is because comparison of image data items cannot be performed even if the process proceeds.

Figure 5:
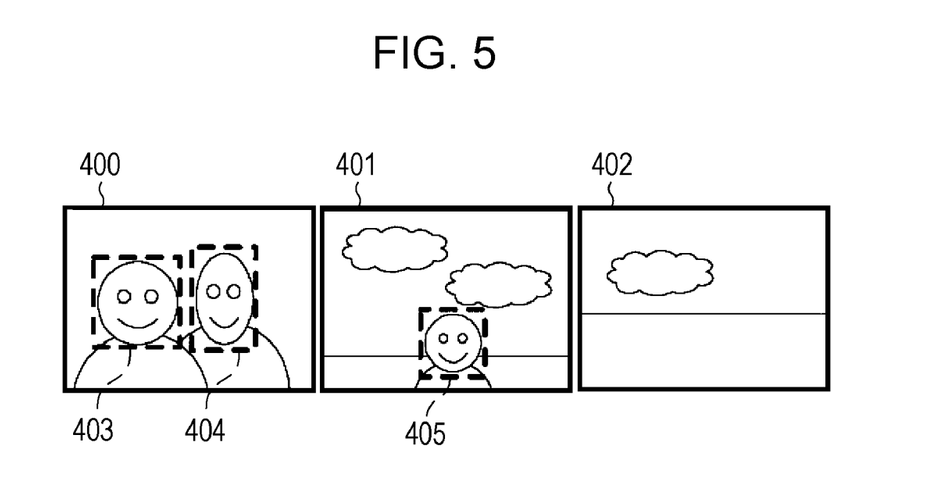
FIG. 5 is an illustration of an example of image data items constituting an image data item group.

FIG. 5 is an illustration of an example of a plurality of image data items constituting an image data item group. In this example, three still-image data items 400 to 402 constitute an image data item group. The image data item 400 contains objects 403 and 404. The difference between the reference feature value and the feature value of the object 403 is smaller than or equal to the predetermined value. The difference between the reference feature value and the feature value of the object 404 is more than the predetermined value. The image data item 401 contains an object 405. The difference between the reference feature value and the feature value of the object 405 is less than or equal to the predetermined value. The image data item 402 does not contain any object, irrespective of a difference from the reference feature value. In the case that the CPU 102 selects a specific image data item from among the image data item group shown in FIG. 5, the image data item 400 containing the object 403 and the image data item 401 containing the object 405 are selected as selected image data items. In this case, the objects 403 and 405 serve as main objects.

After the processing of step S503, the CPU 102 determines, in accordance with predetermined setting values, display forms including the sizes and positions of the main objects contained in the selected image data items in step S504. In this processing, the CPU 102 causes all the selected image data items to be displayed in substantially the same size on the display unit 103 and causes the sizes and positions of the main objects in display regions on the display unit 103 to be substantially the same among all the selected image data items. As a setting value, a default value or a value set by the user may be used. It is not necessary that the sizes of all the selected image data items on the display unit 103 be completely the same. It is necessary that the difference in size between the selected image data items be less than or equal to a predetermined value. In addition, it is not necessary that the sizes and positions of all the main objects be completely the same. It is necessary that the differences in size and position between the main objects be less than or equal to a predetermined value.

In the case that the image data items 400 and 401 are selected as selected image data items, for example, the CPU 102 determines display forms such that the sizes of the objects 403 and 405, which are main objects, are substantially the same and that the objects 403 and 405 are located in portions slightly upper than the center of the display screen.

In step S505, the CPU 102 displays the image data items on the display unit 103 in accordance with the display forms determined in step S504. In this process, the CPU 102 causes the image data items to be aligned on the display unit 103, so that the user can easily compare the image data items. The screen displayed on the display unit 103 in step S505 is referred to as an object comparison screen.

Figure 6:
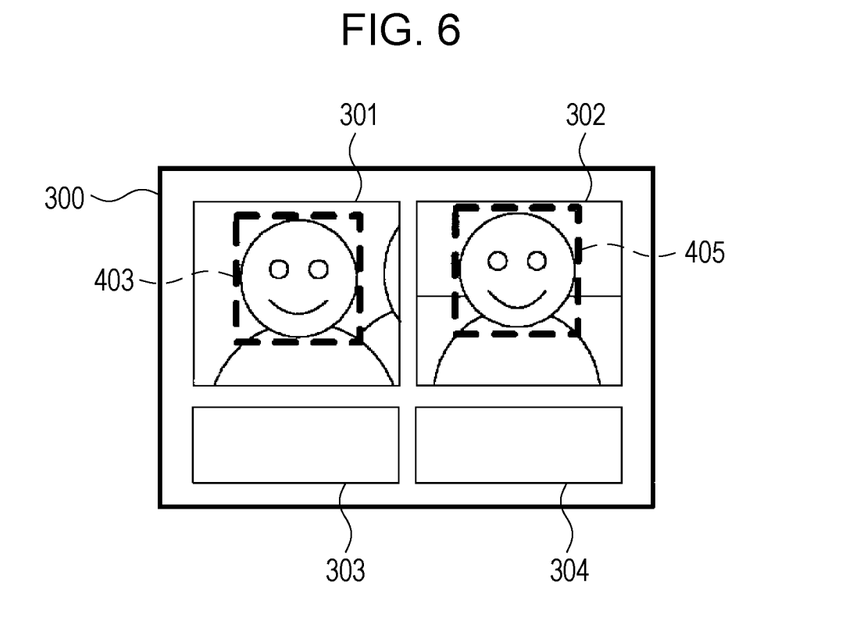
FIG. 6 is an illustration of an example of an object comparison screen.

FIG. 6 is an illustration of an example of an object comparison screen 300. The object comparison screen 300 contains selected image data items 301 and 302. The selected image data items 301 and 302 are parts of the image data items 400 and 401, respectively. The sizes and positions of the objects 403 and 405, which are main objects, are substantially the same. This is because the CPU 102 properly determines the display forms in step S504. The object comparison screen 300 also contains a panel 303 on which an operating icon and the like for the selected image data item 301 is to be displayed and a panel 304 on which an operating icon and the like for the selected image data item 302 is to be displayed. The operating icons provided on the panels 303 and 304 are, for example, icons to be used for changing, editing, and storing of display positions of the selected image data items 301 and 302. A button, an icon, or the like for allowing an operation for one of the selected image data items to be applied to an operation for the other one of the selected image data items may be displayed on each of the panels 303 and 304. In addition, for example, attribute information on the selected image data items 301 and 302, the magnification of the selected image data items 301 and 302, and information on the display positions of the selected image data items 301 and 302 relative to the original image data items may be displayed on the panels 303 and 304.

According to the present embodiment, among a plurality of selected image data items in which positions of main objects, which can be regarded as being identical to a designated object, are different, comparison of the main objects can be easily performed. That is, even though the positions of the objects 403 and 405 in the image data items 400 and 402, the difference between the feature value of each of the objects 403 and 405 and the feature value of the designated object, which is designated by the user and provided with the mark 203, being less than or equal to the predetermined value, are different from each other, comparison between the objects 403 and 405 can be easily performed.

Irrespective of whether the user performs designation or not, an image data item containing an object detected by the CPU 102 may be stored in the data memory 105 or the like but not be deleted. In the case that such processing is performed, when the user wants to perform comparison using the same designated object or a different designated object in the same image data item, the image data item stored in the data memory 105 or the like can be used without performing another detection. That is, even without performing another detection, a list of stored objects or the like is displayed so that the user can designate a designated object.

In the display process of step S505, a plurality of selected image data items may be classified according to one of or both of attribute information of the plurality of selected image data items and information on the feature values of the main objects. For example, the plurality of selected image data items may be classified according to the creation dates or file names of the selected image data items. Furthermore, the plurality of selected image data items may be classified according to the resolutions of the selected image data items, the resolutions of the main objects, the focus accuracies of the objects, or the like. In addition, the plurality of selected image data items may be classified according to a combination of the above-mentioned information. In addition, in the display process of step S505, all the selected image data items may be displayed in a single page or displayed individually in a plurality of pages. In any case, it is desirable that selected image data items should be displayed such that the user can easily perform comparison of main objects.

A second embodiment of the present invention will be described next. The second embodiment is different from the first embodiment in the configuration of an object designation screen and processing relating to the object designation screen. The other features of the configuration of the second embodiment are similar to those of the first embodiment.

Figure 7:
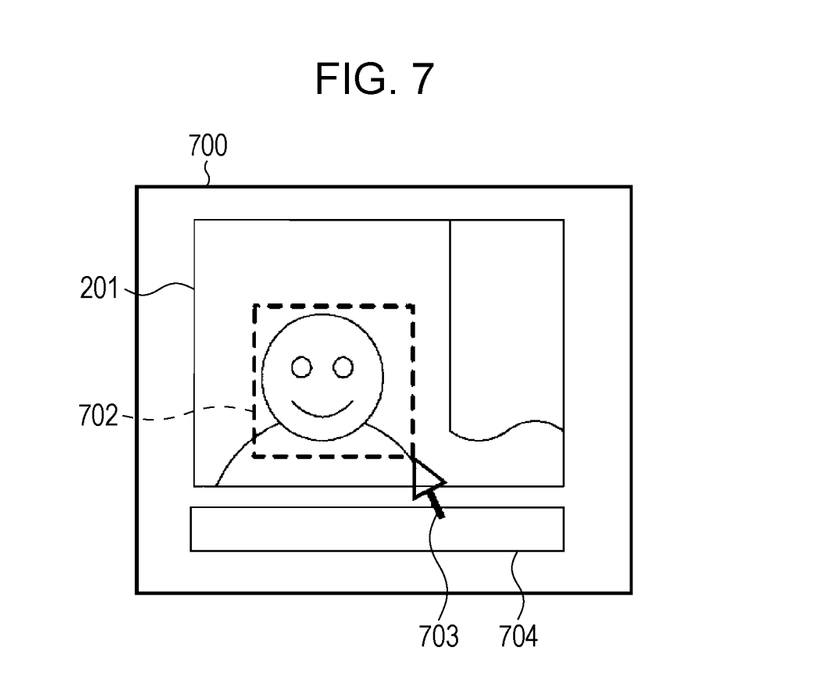
FIG. 7 is an illustration of an example of an object designation screen used in a second embodiment.

FIG. 7 is an illustration of an example of an object designation screen 700. As in the first embodiment, the object designation screen 700 contains the image data item 201 designated by the user and a panel 704 on which a message is to be displayed. A cursor 703 that can be operated by the user is also displayed on the object designation screen 700. In addition, a message urging the user to enclose an object to be designated in a rectangular area designation drawing 702 using the cursor 703 is displayed on the panel 704. Also in the example shown in FIG. 7, a face image is designated as an object. As in the first embodiment, a mark may be provided to the designated object.

In the first embodiment, before the user is allowed to designate an object in step S602, the CPU 102 detects one or more objects and displays the detected one or more objects such that the detected one or more objects can be selected. That is, in the first embodiment, only the objects detected by the CPU 102 can be designated by the user. In contrast, in the present embodiment, the user is able to designate any object. Thus, higher flexibility and higher accuracy in designation of an object, as well as advantages similar to those achieved in the first embodiment, can be achieved in the present embodiment. The area designation drawing 702 is not necessarily rectangular. The area designation drawing 702 may be circular. Alternatively, the area designation drawing 702 may be rendered freehand.

A third embodiment of the present invention will be described next. The third embodiment is different from the first embodiment in processing relating to designation of a designated object. The other features of the configuration of the third embodiment are similar to those of the first embodiment. That is, the third embodiment is different from the first embodiment in the details of the processing of step S501.

Figure 8:
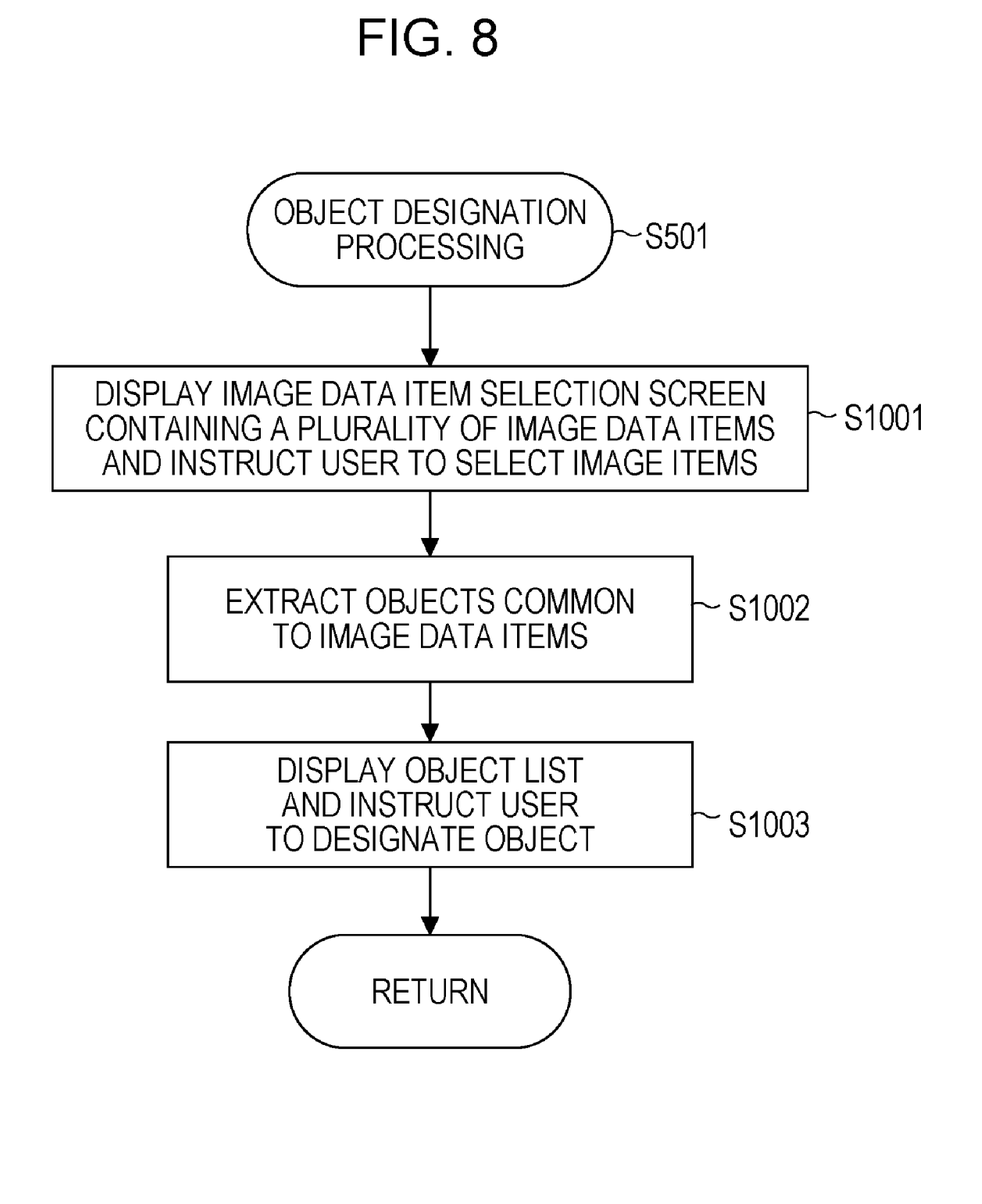
FIG. 8 is a flowchart showing the details of processing of step S501 in a third embodiment.

FIG. 8 is a flowchart showing the details of processing of step S501 in the present embodiment. In the present embodiment, when executing a program stored in the program memory 104, the CPU 102 also serves as a second data item selection unit and an object extraction unit.

In the processing of step S501 in the present embodiment, in step S1001, the CPU 102 causes an image data item selection screen containing a plurality of image data items to be displayed on the display unit 103, and allows the user to select image data items containing objects to be designated.

Figure 9:
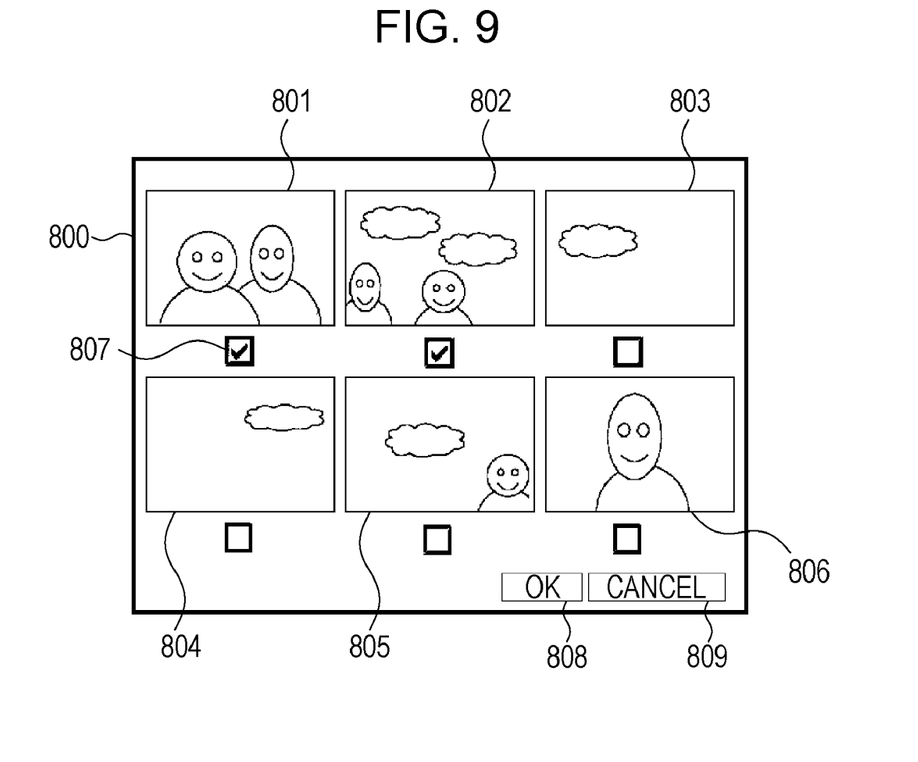
FIG. 9 is an illustration of an example of an image data item selection screen.

FIG. 9 is an illustration of an example of an image data item selection screen 800. For example, the list of image data items 801 to 806, which constitute a specific second image data item group, and a plurality of boxes 807 to be ticked by the user when the user selects the image data items 801 to 806 are displayed on the image data item selection screen 800. In addition, for example, an "OK" button 808 to be clicked by the user when the user desires to continue the processing and a "cancel" button 809 to be clicked by the user when the user desires to restart the processing are displayed on the image data item selection screen 800. The specific second image data item group is stored, for example, in the data memory 105 or a device or the like connected to the network 108. In the example shown in FIG. 9, the image data items 801 and 802 are selected.

After the process of step S1001, the CPU 102 extracts objects that are contained in common in the image data items selected by the user in step S1001. For example, object detection and object identification are performed for each of the selected image data items, and makes a list of objects contained in common in the image data items. In this process, objects contained in common only in some of the selected image data items, as well as objects contained in common in all of the selected image data items, may be listed. In the case that only one image data item is selected in step S1001, objects that can be detected and identified in the selected image data item can be listed.

In step S1003, the CPU 102 causes the list of the objects to be displayed on the display unit 103, and instructs the user to designate one of the objects as a designated object.

Figure 10:
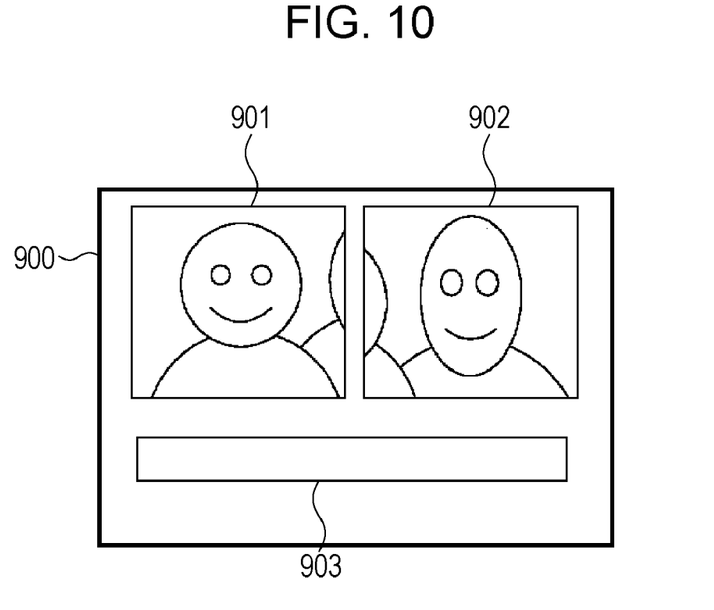
FIG. 10 is an illustration of an example of an object designation screen used in the third embodiment.

FIG. 10 is an illustration of an example of an object designation screen 900. The object designation screen 900 contains the list of objects 901 and 902 and a panel 903 on which a message is to be displayed. For example, the listed objects 901 and 902 are enlarged so as to fit within the screen and the enlarged objects 901 and 902 are displayed. A message urging the user to designate one of the displayed objects 901 and 902 is displayed on the panel 903, and one of the displayed objects 901 and 902 that is designated by the user is defined as a designated object.

In the present embodiment, the processing of step S501 is performed as described above. The processing of step S502 and the subsequent steps are performed as in the first embodiment. In step S503, although a new specific image data item group may be used as in the first embodiment, the second image data item group displayed on the display unit 103 in step S1001 may be used.

According to the present embodiment, advantages similar to those achieved in the first embodiment can be achieved. Moreover, since the user does not need to designate a specific image data item in step S501, an easier operation is provided for the user.

In the case of displaying the list of objects on the object designation screen, the listed objects may be classified in advance. Here, for example, in the case that the priority is designated in advance, the classification can be performed in accordance with the priority. In the case that the priority is not designated, the classification can be performed in accordance with the default order.

In any of the above-described embodiments, moving images, as well as the above-described still images, may be contained as image data items. In the case that moving images are contained, one or more frames of the moving images may be used in various types of processing.

For example, in the case that the object comparison screen 300 is displayed on the display unit 103 in the first embodiment, one of the frames in which main objects appear in moving images can be displayed. In addition, in the case that the relative size or position of a main object contained in moving image data with respect to a display region changes with transition of display frames, it is desirable that the size or position of the main object should be adjusted in accordance with the transition of display frames.

In addition, in the case that the object designation screen 200 or 700 is displayed on the display unit 103, it is desirable that playback, fast-forward, rewind, stop, pause, skip, and the like for moving images can be performed and that the user is able to select a desired frame. In addition, in step S501, the user can select an object or enclose an object using the area designation drawing 702 or the like. In addition, in the case that an object cannot be identified in a frame, it is desirable to skip to a frame in which an object can be identified.

With this processing, even comparison of objects contained in moving images can be performed.

The above-described embodiments of the present invention can be attained, for example, when a computer executes a program. In addition, an embodiment of the present invention can also be applied to a unit for supplying the program to the computer, for example, a computer-readable recording medium, such as a compact disc read-only memory (CD-ROM), in which such a program is recorded or a transmission medium, such as the Internet, for performing transmission of such a program. In addition, an embodiment of the present invention can also be applied to the above-mentioned print processing program. The above-mentioned program, recording medium, transmission medium, and program product are included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-146021, filed May 31, 2007, which is hereby incorporated by reference herein in its entirety.

What is claimed is:

1. An information processing apparatus comprising:
   an object designation unit configured to designate an object as a designated object;
   a data item selection unit configured to automatically select, from among a specific image data item group, two or more image data items containing objects each being different from an object designated by the object designation unit by an amount less than or equal to a first predetermined value; and
   a display control unit configured to display the two or more image data items selected by the data item selection unit in two or more display regions provided on a display unit,
   wherein the display control unit defines, as main objects, the objects each being different from the designated object by the amount less than or equal to the first predetermined value, adjusts the two or more image data items such that differences in position and size of the main objects in the display regions between the two or more image data items are made less than or equal to a second predetermined value, and displays an adjusted two or more image data items.

2. The information processing apparatus according to claim 1,
   wherein the image data item group includes a still-image data item and a moving-image data item.

3. The information processing apparatus according claim 1,
   wherein the object designation unit designates, as the designated object, an object contained in a desired image data item.

4. The information processing apparatus according to claim 1,
   wherein the object designation unit extracts one or more objects from a desired image data item and designates, as the designated object, one of an extracted one or more objects.

5. The information processing apparatus according to claim 1,
   wherein the object designation unit includes
   a second data item selection unit configured to select two or more image data items from a specific second image data item group, and
   an object extraction unit configured to extract one or more objects contained in common among two or more image data items selected by the second data item selection unit, and
   wherein the object designation unit designates, as the designated object, one of the one or more objects extracted by the object extraction unit.

6. The information processing apparatus according to claim 1,
   wherein the data item selection unit selects the two or more image data items based on a feature value of the designated object and feature values of the objects contained in the image data items constituting the specific image data item group.

7. The information processing apparatus according to claim 1,
   wherein the display control unit classifies the two or more image data items selected by the data item selection unit based on at least one attribute information of the two or more image data items and information relating to feature values of the main objects contained in the two or more image data items, and displays the classified two or more image data items.

8. The information processing apparatus according to claim 1,
   wherein, when a moving-image data item is included in the two or more image data items selected by the data item selection unit, when a relative size of a main object contained in the moving-image data item with respect to display region changes with transition of display frames, the display control unit adjusts a size of the main object in accordance with the transition of the display frames.

9. The information processing apparatus according to claim 1,
   wherein when a moving-image data item is included in the two or more image data items selected by the data item selection unit, when a relative position of a main object contained in the moving-image data item with respect to display region changes with transition of display frames, the display control unit adjusts a position of the main object in accordance with the transition of display frames.

10. The information processing apparatus according to claim 1,
    wherein the display control unit displays display magnifications of the two or more image data items selected by the data item selection unit.

11. An information processing method comprising:
    an object designation step of designating an object as a designated object;
    a data item selection step of automatically selecting, from among a specific image data item group, two or more image data items containing objects each being different from an object designated by the object designation unit by an amount less than or equal to a first predetermined value; and
    a display control step of displaying the two or more image data items selected in the data item selection step, in two or more display regions provided on a display unit,
    wherein in the display control step, the objects each being different from the designated object by the amount less than or equal to the first predetermined value are defined as main objects, the two or more image data items are adjusted such that differences in position and size of the main objects in the display regions between the two or more image data items are made less than or equal to a second predetermined value, and the adjusted two or more image data items are displayed.

12. A computer-readable storage medium storing thereon a program for causing a computer to execute processing, the program comprising:
    an object designation step of designating an object as a designated object;
    a data item selection step of automatically selecting, from among a specific image data item group, two or more image data items containing objects each being different from an object designated by the object designation unit by an amount less than or equal to a first predetermined value; and
    a display control step of displaying the two or more image data items selected in the data item selection step, in two or more display regions provided on a display unit,
    wherein in the display control step, the objects each being different from the designated object by the amount less than or equal to the first predetermined value are defined as main objects, the two or more image data items are adjusted such that differences in position and size of the main objects in the display regions between the two or more image data items are made less than or equal to a second predetermined value, and the adjusted two or more image data items are displayed.

* * * * *